US005166883A

United States Patent [19]

Gilham

[11] Patent Number: 5,166,883

[45] Date of Patent: Nov. 24, 1992

[54] FRANKING MACHINE

[75] Inventor: Dennis T. Gilham, Brentwood, United Kingdom

[73] Assignee: Alcatel Business Systems Limited, Romford, United Kingdom

[21] Appl. No.: 579,687

[22] Filed: Sep. 10, 1990

Related U.S. Application Data

[63] Continuation of Ser. No. 206,803, Jun. 5, 1988, abandoned.

[30] Foreign Application Priority Data

Jun. 17, 1987 [GB] United Kingdom ................. 8714192

[51] Int. Cl.[5] ................................................ G06F 15/20

[52] U.S. Cl. ............................ 364/464.02; 346/140 R

[58] Field of Search ............... 346/140 R; 364/464.02, 364/464.03

[56] References Cited

U.S. PATENT DOCUMENTS 4,168,533 9/1979 Schwartz ............................ 364/900
4,490,728 12/1984 Vaught et al. .............. 346/140 R X
4,509,141 4/1985 Soderberg et al. ........ 364/464.02 X
4,516,209 5/1985 Scribner ......................... 364/464.03
4,638,337 1/1987 Torpey et al. .................. 346/140 R
4,646,105 2/1987 Matsumoto et al. ....... 346/140 R X
4,725,861 2/1988 Oda ................................ 346/140 R
4,797,832 1/1989 Axelrod et al. ............ 364/464.02 X
4,800,506 1/1989 Axelrod et al. ............ 364/464.02 X
4,801,951 1/1989 Shimazaki ....................... 346/140 R
4,854,754 8/1989 Miura et al. ................ 346/140 R X
5,040,001 8/1991 Dunn et al. ..................... 346/140 R

*Primary Examiner*—Parshotam S. Lall
*Assistant Examiner*—Edward R. Cosimano
*Attorney, Agent, or Firm*—Shoemaker and Mattare Ltd.

[57] ABSTRACT

A franking machine is disclosed which has a microprocessor for carrying out accounting and control functions and in which printing of a franking impression is effected by ejecting droplets of ink from ink filled nozzles by means of selectively heatable elements which vaporize the ink or a constituent thereof to the rear of the nozzles and thereby eject the ink droplets. The nozzles may be stationary and be supplied with ink through a common pipe connected to a reservoir or the nozzles may be constituted by pores in a belt which is driven through an ink reservoir and then past the heatable elements.

3 Claims, 2 Drawing Sheets

FRANKING MACHINE

CROSS REFERENCES TO RELATED APPLICATIONS

This is a continuation of application Ser. No. 07/206,803, filed Jun. 5, 1988 now abandoned.

BACKGROUND OF THE INVENTION

This invention relates to franking machines for applying a franking impression to mail items.

Commonly used franking machines include a mechanical printing device consisting of settable print wheels housed in a print drum. The print drum carries on its surface a raised pattern of fixed information to be printed and print characters on the peripheries of the print wheels are utilised to print variable information such as the value of franking and the date. When it is desired to effect franking of a mail item, the print wheels are rotated to bring print characters thereon, corresponding to the required value of franking, into an operative printing position in which the required print characters are positioned to project through an aperture in the wall of the print drum. The drum is then caused to rotate through one revolution during which the raised pattern on the drum and the operative print characters are brought firstly into contact with an inking device and then into contact with the mail item which is pressed against the drum by a pressure roller so that the main item is fed with the rotation of the drum at the same linear speed as that of the peripheral surface of the drum.

The print wheels may be set to the required value of printing by means of manually operable levers or sliders devices which are mechanically coupled to the print wheels. Alternatively the print wheels may be mechanically coupled of electric motors which are driven under the control of electrical signals from a keyboard. In both of these constructions the print wheel setting requires the provision of relatively complex mechanical linkages to ensure precise setting of the print wheels. In addition, for accounting purposes the value to which the print wheels are set needs to be input to an accounting device in the franking machine. In present franking machines the accounting device usually consists of electronic circuits including a microprocessor and data storage registers. Accordingly is is necessary to provide electro-mechanical transducers to convert the mechanical setting of the print wheels into electrical signals which can be utilised by the electronic accounting circuits.

It has been poroposed to use thermal transfer printing devices in a franking machine. In thermal transfer printing a ribbon having an ink coating adhered a plurality of selectively heatable print elements and a mail item and upon heating of selected print elements the ink on the ribbon adjacent those heated elements is transferred from the ribbon to the surface of the mail item to form a desired printed pattern. The printing elements of such a thermal transfer printer are heated by the passage of electrical current therethrough and the routing of electrical current to the selected elements is carried out by electronic switching circuits. As a result the selection of printing elements to print a required value of franking does not required setting of mechanical elements or the conversion from mechanical setting to corresponding electrical signals.

Both mechanical impression printing and thermal transfer printing as described hereinbefore require the surface of the mail item to be urged into intimate contact respectively with the printing elements and the transfer ribbon. Mail items may vary substantially in thickness and hence difficulties arise in ensuring the required intimate contact. Accordingly it would be desirable to utilise a method of printing which does not require such contact with the surface of the mail item.

SUMMARY OF THE INVENTION

According to the invention a franking machine includes electronic circuits for carrying lout accounting and control functions in respect of a selected value of franking; a plurality of apertures or nozzles for containing ink; means to apply ink to the apertures or nozzles; feed means operable to feed a mail item past said apertures or nozzles; and a plurality of selectively heatable elements operative when heated to eject ink from said apertures or nozzles towards a mail item being fed by said feed means; print control means operable by said electronic circuits to selectively heat said elements repeatedly in synchronism with feeding of a mail item by the feed means to print a franking pattern on said mail item.

Preferably the heatable elements are arranged in a row extending perpendicular to the direction of feed of a mail item by said feed means.

The apertures or nozzles may be stationary relative to the heating elements or the apertures or nozzles may be carried in a belt movable sequentially past an ink reservior and the heatable elements.

BRIEF DESCRIPTION OF THE DRAWINGS

An embodiment of the invention will now be described by way of example with reference to the drawings in which:-

DESCRIPTION OF THE PREFERRED EMBODIMENTS

Figure 1:
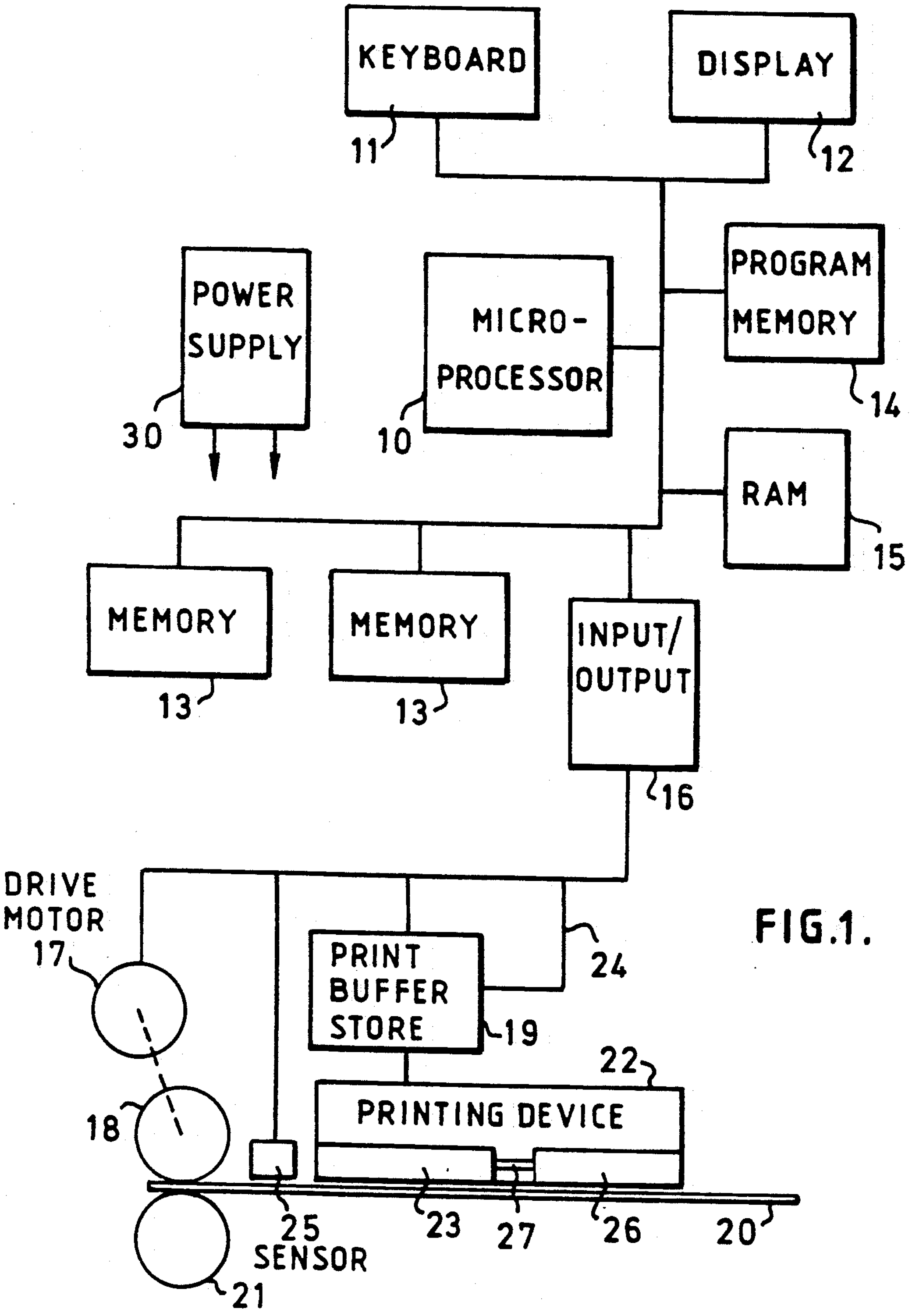
FIG. 1 is a block schematic of a franking machine constructed and arranged to operate in accordance with the invention.

Referring to FIG. 1 of the drawings a franking machine includes electronic circuits for controlling the printing of franking impressions on mail items and for carrying out accounting functions whereby credit values can be stored in the machine and progressively used in carrying out franking operations. The electronic circuits include a microprocessor 10, a keyboard 11 to enable a user to enter commands and data into the microprocessor, a digital display 12 for displaying data to provide information to the user and electronic data storage devices 13 for storing accouting data. The data storage devices each comprise a descending regiser for storing the current value of credit available for use in franking, an ascending register to store the total value of franking used and an further register to store a count of the number of mail items franked. In order to provide secure retention of the data and to protect against corruption of the data, each of these registers is duplicated in each storage device 13 so that each storage device stores two copies of the data in the registers. The microprocessor 10 operates under the control of programs stored in a program memory 14 and is programmed to carry out checks between the duplicate registers to compare their stored values. If the stored values of the registers are found to be in agreement the microprocessor permits franking operations to be effected by a user. However in the event that comparison of the stored values of duplicate registers indicates that the values differ franking operations are inhibited and the franking machine must be returned to a service centre for re-validation. The microprocessor 10 is also provided with random access memory 15 for storing data used in the accounting and control functions carried out by the microprocessor.

When a franking operation is to be carried out, the value of franking desired is entered on the keyboard and this value is echoed on the display. The microprocess interrogates the descending register to determine whether there is sufficient credit available for the required franking. If there is sufficient credit available, the value in the descending register is decremented, the value in the ascending register is incremented by the value of franking and the item count is incremented by one. In addition the microprocessor 10 outputs a drive control signal via input/output device 16 to energise a drive motor 17 to drive a feed roll 18. The microprocessor 10 also output via the input/output device print control signals to a print buffer store 19. Energisation of the drive motor causes a mail item 20 to be fed by the feed roll 18 and a co-operating pressure roll 21 along a feed bed past a printing device 22 such that the surface of the mail item 20 passes close to a print head 23 of the printing device.

The printing devce 22 is a thermally operated ink jet printer in which ink is held in a plurality of apertures or nozzles and is ejected selectively from these nozzles. Each aperture or nozzle is associated with a selectively heated element and upon heating of an element a bubble is formed behind the ink in the nozzle associated with that element and this causes the ink to be ejected from the nozzle and be projected onto the surface of a mail item adjacent the nozzle. The nozzles of the printing device are preferably arranged in a single column extending perpendicular to the direction of feed of the mail item. The heating elements of the printing device are selectively and repeatedly energised to cause ejection of ink from the apertures in synchronism with the passage of the mail item 20 past the printing device 22 whereby the required printing of the franking and of any additional material such as an advertising slogan is effected. The print control signals output by the microprocessor 10 to the print buffer store 19 are temporarily stored in the buffer store 19. The buffer store 19 comprises a shift register which has its stages connected in parallel to the respective heating elements of the printing device. The microprocessor outputs print control signals to the buffer store 19 corresponding to the energisation of the heating elements required to effect printing of a column of dots forming the required pattern. The signals are read out in parallel from the stages of the shift register in synchronism with the feeding of the mail item by strobe signals applied to the buffer store on line 24. Thus the required printed pattern is formed column by column as the mail item passes the printing device. Means 25 are provided to detect the presence of a mail item 20 at the printing device 22 before commencement of printing in order to prevent operation of the printer if no mail item is present for franking.

It will be appreciated that because the ink is ejected from the nozzle by pressure, created from the formation of a bubble by energisation of the heating element, the ink is projected towards the surface of the mail item with sufficient velocity to traverse any small gap between the suface of the mail item and the nozzle. Thus printing is effected without intimate contact with the surface of the mail item as is required in thermal transfer printing using a transfer ribbon or with mechanical impression printing.

Figure 2:
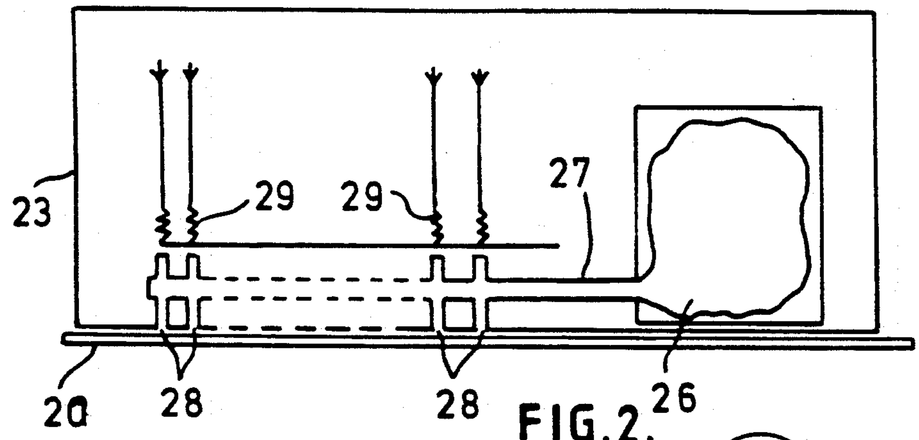
FIG. 2 illustrates one form of printing device used for printing a franking impression in the franking machine of FIG. 1

The printing device 22 may be of the form shown in FIG. 2 in which the nozzles and the heating elements of the print head 23 are stationary relative to one another. Ink is fed from a common reservoir 26 in the form of a collapsible container through a supply pipe 27 to a plurality of nozzles 28 arranged in a line extending transversely to the direction of feed of the mail items 20. A like plurality of heating elements 29 is provided with the heating elements being located immediately to the rear of the respective nozzles 28. Energisation of a selected heating element 29 by a print control signal strobed from the buffer store 19 results in heating and vaporisation of the ink, or a constituent of the ink, at the rear of the nozzle associated with the selected energised heating element. A vapour bubble is formed in a very short instant of time adjacent the heating element and this is effective to eject a drop of ink from the aperture of the nozzle 28 toward the surface of the mail item 20 positioned in front of the print head 23. Upon deenergisation of the heating elements, the ink cools, the bubbles formed during energisation of the heating elements contract and replenishment of the ink ejected is provided from the reservoir 26. One end of the heating elements may be connected in common to a power supply 30 (FIG. 1), the other ends of the heating elements being connected through suitable drive circuits controlled by the stages of the buffer store 19.

Figure 3:
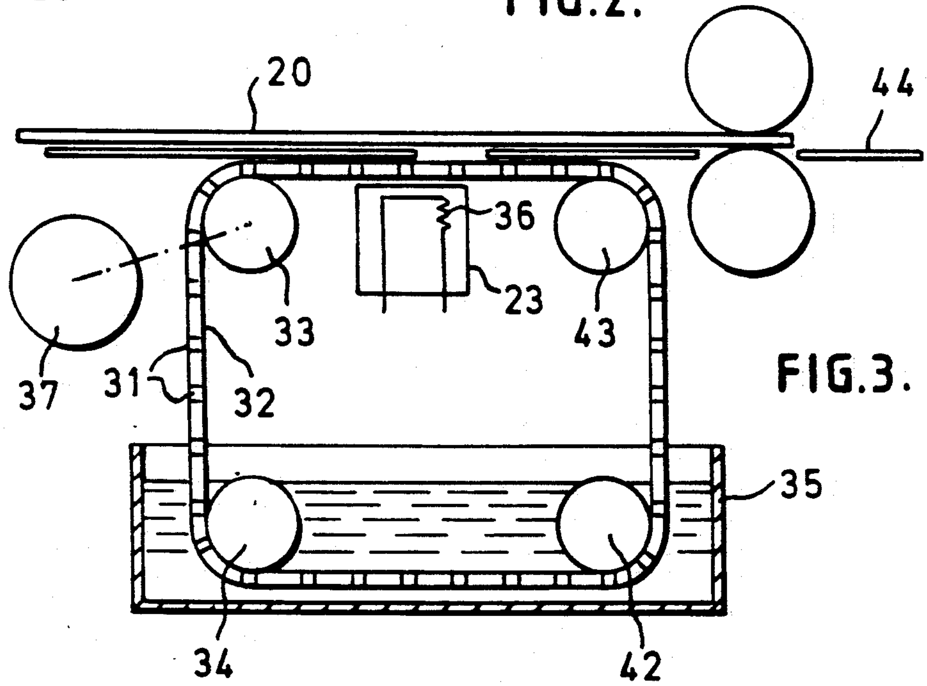
FIG. 3 illustrates an alternative form of printing device used in the franking machine of FIG. 1

In another form of printing device illustrated in FIG. 3 and similar to that described in European Patent Application 0 195 863, the nozzles consist of apertures or pores 31 in an endless belt 32 which is guided by rollers 42, 43 to pass through an ink reservoir 35 and then to pass heating elements 36. One or both the rollers 34, 42 positioned in the ink reservoir may be of sponge material, or have a peripheral layer of sponge material, to assist in ensuring that the pores 31 are filled with ink during passage of the belt through the reservoir. The endless belt is driven by a drive motor 37 coupled to the roller 33. The heating elements are arranged in a line extending transversely of the belt 32. Energisation of a selected heating element 36 causes vaporisation of the ink or a constituent thereof and resultant formation of a bubble effective to eject ink from any pore 31 which at that time is in front of the selected energised heating element. Thus it will be appreciated that the positions at which ink is ejected is determined by the positions of the selected energised heating elements 36. The pores in the belt may be of substantially the same area as the heating elements or if desired the apertures may be of substantially smaller area than the heating elements and at a greater density so that a plurality of apertures would be in front of each heating element at any time. Thus energisation of a single heating element would result in the ejection of a plurality of ink drops from a plurality of adjacent pores.

Figure 4:
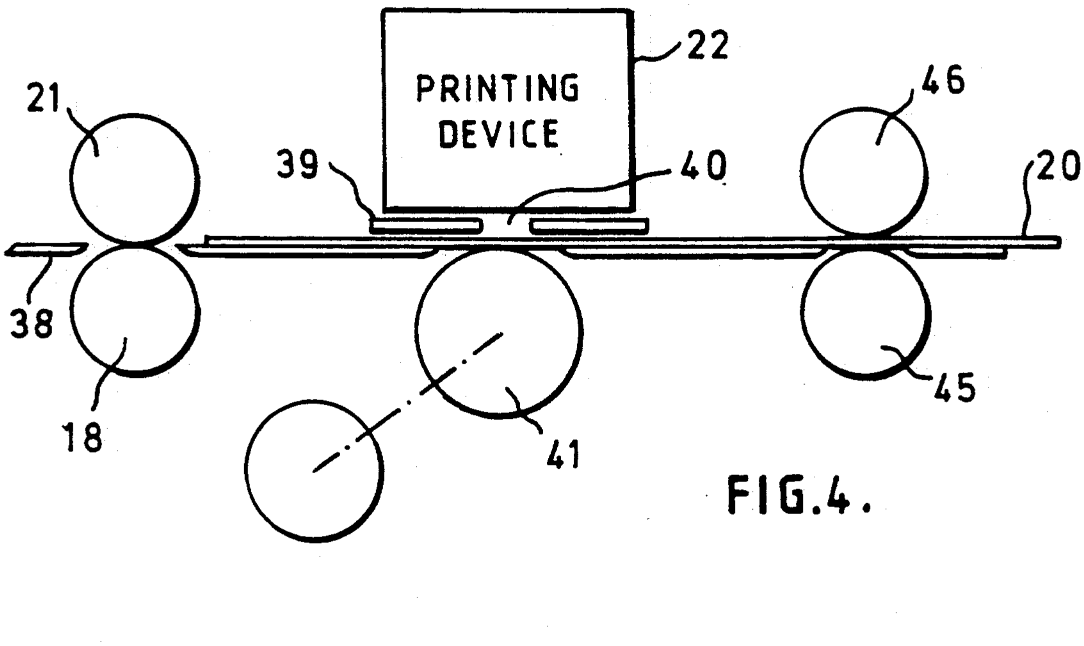
FIG. 4 illustrates means for feeding mail items past the printing device of the franking machine.

As shown in FIG. 4, the mail items 20 are fed along a feed bed 38 past the printing device 22 by means of one or more driven feed rolls 18, 45 and co-operating pressure rolls 21, 46. The feed bed may act as a platen to position the reverse face of the mail item relative to the print head 23. Alternatively, as shown in FIG. 4, an apertured plate 39 may be provided adjacent the print head, the aperture 40 in the plate 39 being aligned with the region in which printing is effected and the front surface of the mail item is urged against the plate by an impression roller 41 which is resilient or is resiliently urged toward the pressure plate. This arrangement ensures that the front surface of the mail items on which printing is to be effected is maintained at a predetermined uniform position relative to the print head by the plate 39.

It will be appreciated that with the construction of printing device shown in FIG. 3, in which the belt 32 follows a simple path, the printing is effected on the underneath surface of the mail items 20 as they are fed along feed bed 44. It is considered that this would generally be acceptable. However if it is desired to effect printing on the upper surface of the mail items, the belt 32 may be guided by additional rollers to follow a more complex path such that the belt passes horizontally above an upper surface of the mail items. Accordingly with the print head 23 positioned over the horizontal run of the belt, printing can be effected by ejecting ink droplets downwardly onto the upper surface of the mail items.

The print head has been described hereinbefore as having a single row of heating elements selectively and repeatedly energisable to cause ejection of ink droplets to form a franking impression or other print impression as the mail item is fed past the print head. If desired more than one row of selectively heatable elements may be provided and the elements may be arranged in matrix formation whereby a complete section of a desired impression may be printed at the same time instead of being printed serially as with a single row of elements.

I claim:

1. A franking machine including electronic microprocessor means;

a program memory storing at least one program; said microprocessor means being operable in a franking operation to carry out accounting and control functions under the control of said program;

a data memory connected to said microprocessor means to store data relating to usage of the franking machine in franking operations;

input means connected to the microprocessor means to input a required postage value to the microprocessor means;

said microprocessor means being operative in said franking operation to output a feed signal and to output print signals representing a franking impression including said required postage value to be printed;

a buffer memory to receive and store said print signals representing the franking impression including said required postage value to be printed;

a plurality of heatable elements, selected ones of said elements being heated in response to said print signals stored in said buffer memory;

feeding means for feeding a mail item along a feed path extending adjacent to and spaced from said heatable elements; drive means responsive to said feed signal to drive said feeding means to feed the mail item along said feed path past said heatable elements;

an endless belt having a plurality of apertures extending though the thickness of the belt; an ink reservoir;

belt drive means to guide and drive the belt around a closed path in which the apertures pass successively through ink in said reservoir to fill the apertures with ink and between the plurality of heatable elements and the mail item fed along the feedpath; and said heating of said selected elements being effective to eject ink droplets from those ones of said apertures adjacent said heatable elements onto said mail item fed along said feed path by said feeding means to print said franking impression including said required postage value on said mail item.

2. A franking machine as claimed in claim 1 wherein the heatable elements are disposed in a row extending transversely to the feed path.

3. A franking machine as claimed in claimed in claim 1 including sensing means responsive to feeding of a mail item along the feed path past the heatable elements to generate a sense signal and wherein the microprocessor means is operative in response to said sense signal to initiate the heating of selected heatable elements to print the franking impression.

* * * * *